US005332994A

United States Patent [19]

Kawashima et al.

[11] Patent Number: 5,332,994

[45] Date of Patent: Jul. 26, 1994

[54] RADIO PAGER WITH POWER-BACKUP MEMORY FOR STORING UNCOMPLETED MESSAGES

[75] Inventors: Shinichi Kawashima; Hiroaki Shibayama, both of Tokyo, Japan

[73] Assignee: NEC Corporation, Tokyo, Japan

[21] Appl. No.: 835,330

[22] Filed: Feb. 14, 1992

[30] Foreign Application Priority Data

Feb. 14, 1991 [JP] Japan .................................. 3-040757
Feb. 28, 1991 [JP] Japan .................................. 3-057773

[51] Int. Cl.$^5$ ................................................ H04Q 7/00

[52] U.S. Cl. ............................ 340/825.44; 340/825.48

[58] Field of Search ........... 340/825.44, 311.1, 825.48; 455/38.2, 38.4, 38.3

[56] References Cited

U.S. PATENT DOCUMENTS

| | | | |
|---|---|---|---|
| 4,701,759 | 10/1987 | Nadir et al. | 340/825.44 |
| 4,755,816 | 7/1988 | DeLuca | 340/825.44 |
| 4,768,031 | 8/1988 | Mori et al. | 340/825.44 |
| 4,851,829 | 7/1989 | DeLuca et al. | 340/825.44 |
| 4,872,005 | 10/1989 | DeLuca et al. | 340/825.44 |
| 5,012,219 | 5/1991 | Henry | 340/825.44 |

FOREIGN PATENT DOCUMENTS

| | | |
|---|---|---|
| 0297366 | 1/1989 | European Pat. Off. . |
| WO9010359 | 9/1990 | PCT Int'l Appl. . |
| 2114343 | 8/1983 | United Kingdom . |

*Primary Examiner*—Donald J. Yusko
*Assistant Examiner*—Edwin C. Holloway
*Attorney, Agent, or Firm*—Sughrue, Mion, Zinn, Macpeak & Seas

[57] ABSTRACT

In a radio pager, a power-backup memory is provided for storing messages. On receiving a paging signal, a message contained in it is stored into the memory and the user is alerted with a first sound pattern. A specified label is attached to the stored message if it is not answered by the user within a prescribed interval. When the pager is turned off for battery savings purposes, the message is kept in the memory and when it is turned on again, the memory is searched. If a message attached with the specified label is detected, the user is alerted with a second sound pattern which is different from the first sound pattern. The different sound allows the user to quickly recognize that he is alerted by an uncompleted page.

2 Claims, 3 Drawing Sheets

RADIO PAGER WITH POWER-BACKUP MEMORY FOR STORING UNCOMPLETED MESSAGES

BACKGROUND OF THE INVENTION

The present invention relates to radio pagers having a memory for storing messages.

With conventional radio pagers, received messages are stored temporarily into a memory for later retrieval. If a message is not answered by a called user, it is stored in the memory and a short beep sound is periodically generated to remind the user of the uncompleted page. However, if the user inadvertently turns off the pager for power savings purposes, uncompleted pages which might be stored in the memory will be completely lost.

SUMMARY OF THE INVENTION

It is therefore an object of the present invention to provide a radio pager for storing uncompleted messages during turn-off periods and alerting the user when the pager is turned on again.

According to the present invention, the radio pager comprises a receiver for detecting a paging signal addressed to the pager and a power-backup memory for storing messages. The receiver is the main power consuming unit of the pager and is often turned off for saving battery power. On receiving a paging signal, a message contained in it is stored into the memory and the user is alerted with a first sound pattern. A specified label is attached to the stored message if it is not answered by the user within a prescribed period of time. When the pager is turned off, the message is kept in the memory and when it is turned on again, the memory is searched. If a message attached with the specified label is detected in the memory, the user is alerted with a second sound pattern different from the first sound pattern. The different sound allows the user to quickly recognize that he is alerted by an uncompleted page.

In a preferred embodiment, each stored message is classified with a first label before alerting the user with a first sound pattern, and the label of the stored message is changed to a second label if the message is not answered within a prescribed period of time. When the pager is turned on again, the memory is searched. If a message attached with one of the first and second labels is detected, the user is alerted with the second sound pattern. In a further preferred embodiment, unique sound patterns are respectively assigned to the messages attached with the first and second labels to allow users to distinguish between the uncompleted messages.

BRIEF DESCRIPTION OF THE DRAWINGS

The present invention will be described in further detail with reference to the accompanying drawings, in which.

DETAILED DESCRIPTION

Figure 1:
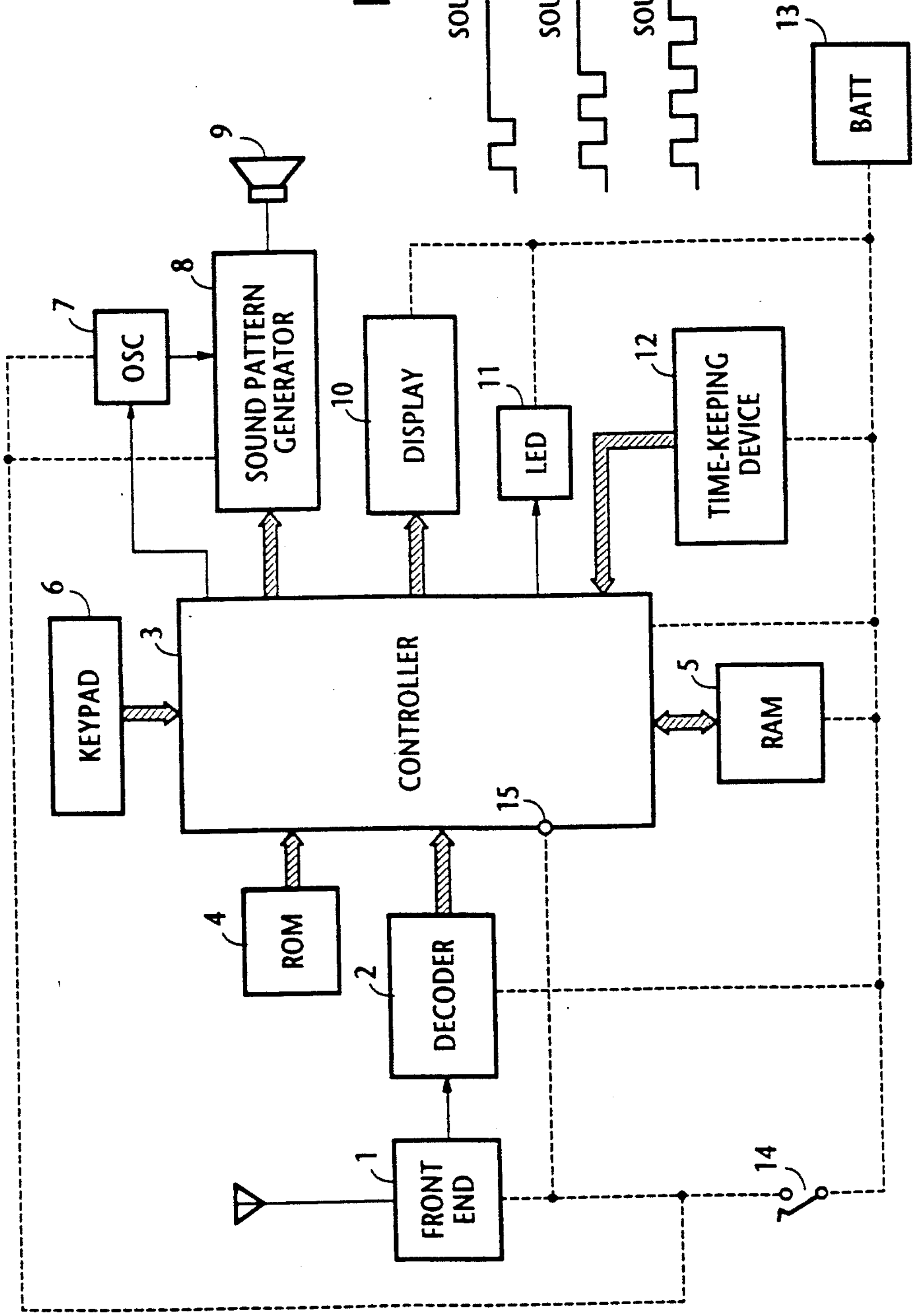
FIG. 1 is a block diagram of a radio display pager of the present invention.
Figure 2:
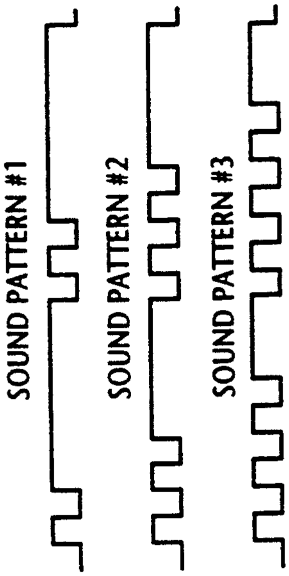
FIG. 2 is a waveform diagram of sound patterns.

In a radio display pager shown in FIG. 1, paging signals recovered by front end 1 are decoded by decoder 2 into a form suitable for digital processing by a controller 3 which is programmed to perform instructions shown in FIGS. 2 and 3. A pager identifier assigned to the pager is stored in ROM 4 and received messages are stored in RAM 5. A keypad 6 is coupled to the controller 3 for answering incoming pages, reading the contents of RAM 5, or erasing unnecessary messages. An audio-frequency oscillator 7 is provided for generating an audio frequency tone signal. A sound pattern generator 8 stores a plurality of predetermined patterns, or cadences as shown in FIG. 2 and generates one of the stored cadences to modulate the tone signal and drives a speaker 9 with the modulated tone. A liquid crystal display 10 is coupled to controller 3 to provide a display of a message and a time stamp attached to it. A light-emitting diode 11 is activated when the user is alerted. A time-keeping device 12 supplies time-of-day data to controller 3. All components of the pager are powered from the battery 13. For power savings purposes, a power switch 14 is connected between battery 13 and power-drain units such as front end 1 and oscillator 7. In particular, RAM 5 is backed up by battery 13 to prevent its contents from being inadvertently lost when the pager is turned off. Controller 3 has a terminal 15 for sensing when power switch 14 is turned on.

Figure 3A:
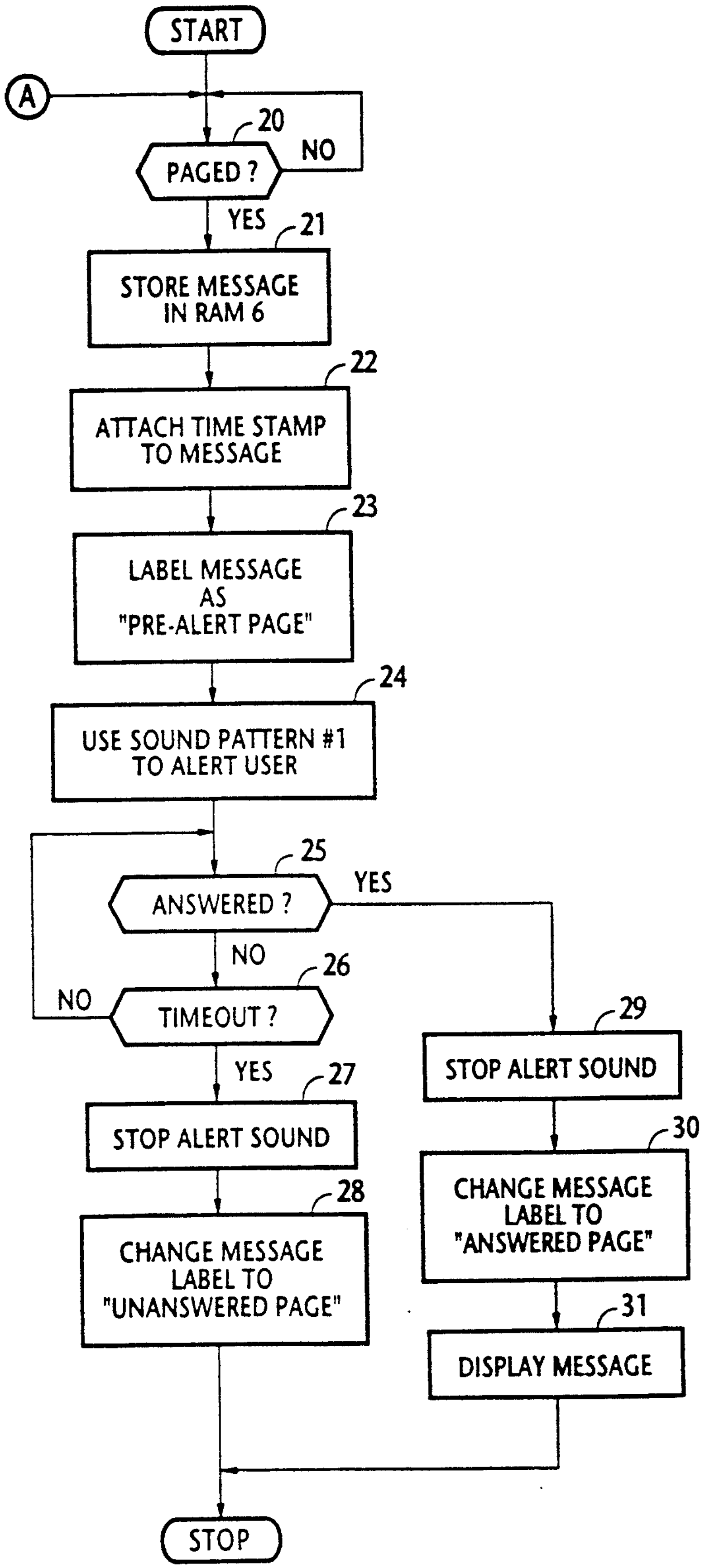
FIGS. 3A and 3B are flowcharts describing programmed instructions performed by the controller of FIG. 1.
Figure 3B:
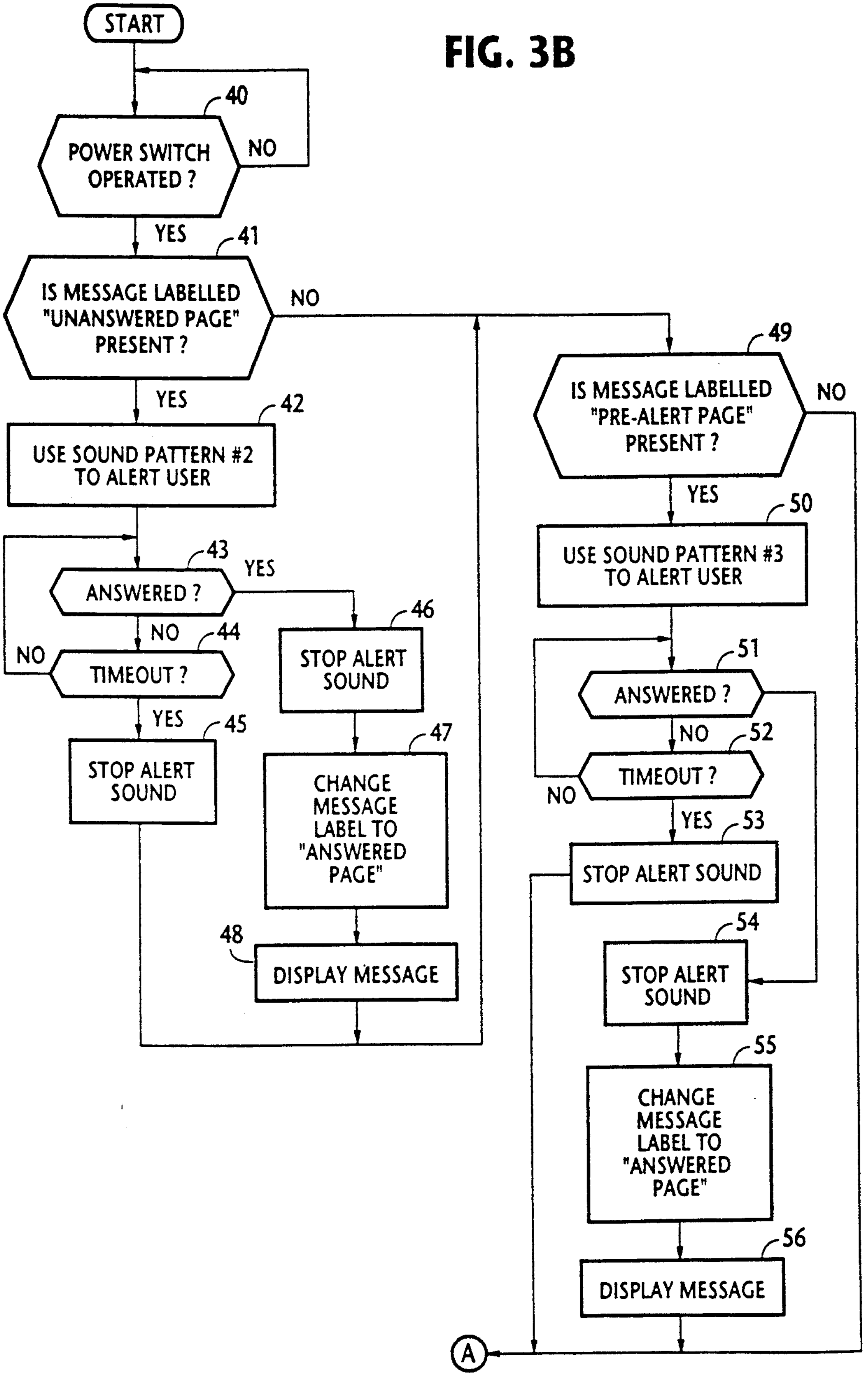

In operation, if a paging signal is received, it is checked for coincidence between the identifier contained in it and an identifier stored in ROM 4 (step 20 in FIG. 3A). If they match, the message contained in the received signal is stored in RAM 5 (step 21) and time-of-day is fetched from time-keeping device 12 and attached to the stored message as a time stamp (step 22). The incoming message is labelled as a "pre-alert page" (step 23). Sound pattern #1 (FIG. 2) is then selected by the controller from sound pattern generator 8 to modulate the tone signal from oscillator 7. The user is therefore alerted with sound pattern #1 if the received page is of most recent arrival. On hearing this sound pattern, the user operates the keypad 6 to answer the page (step 25). When this occurs, the alerting sound is stopped (step 29) and the label of the stored message is changed to a label "answered page" and the message and its time stamp are displayed on LCD 10 (steps 30, 31). If the user fails to notice the alert sound and a predetermined time-out period has lapsed (step 26), the sound is automatically stopped (step 27) and the message label is changed to "unanswered page" (step 28).

Therefore, if the user turns off the pager by operating power switch 14 for power savings purposes, possibility exists that uncompleted messages are lost completely.

When the pager is turned on again (step 40, FIG. 3B), controller 3 knows that terminal 15 is at a specified voltage level and proceeds to check the contents of RAM 5 for a message classified with a label "unanswered page" (step 41). If such a message is present in memory 5, the user is alerted with a sound pattern #2, indicating that there has been an unanswered page (step 42). If the user operates the keypad to answer the page (step 43), the sound is stopped (step 46) and the message label is changed to "answered page" and the message and its time stamp are displayed (steps 47, 48). The sound is also stopped when a time-out period expires following execution of step 43 (steps 44, 45).

If the answer is negative in step 41, control branches to step 49 to check to see if a message labelled "pre-alert" page is present. If the answer is negative, the program execution is terminated. Otherwise, it branches to step 50 to alert the user with a sound pattern #3 signifying that a pre-alert page is in memory 5. If the user answers the page (step 51), the alert is stopped (step 54) and the message label is changed to "answered page" and the message and its time stamp are displayed (steps 55, 56). No answering results in the sound being halted (steps 52, 53).

If the user successively hears sound patterns #2 and #3, he recognizes that an unanswered message and a pre-alert message have already been received and stored in memory 5.

Following the alerting of stored messages just described, control moves to step 20. If a new incoming page arrives almost at the same time the pager is turned on, control advances to step 20 following the prosecution of steps 40 to 56, and branches at step 20 to step 21 to proceed with the alerting of the user with sound pattern #1. Thus, the stored messages are retrieved first for alerting the user when the pager is turned on by having an incoming page wait in a queue.

What is claimed is:

1. A radio pager, comprising:

receiver means for detecting a paging signal addressed to the pager;

a battery;

a manually operated power switch for activating said receiver means with said battery when the pager is in use and deactivating said receiver means when the pager is not in use;

a memory constantly activated by the battery;

control means for storing into said memory a message transmitted by said paging signal, classifying the stored message with a first label indicating that the stored message is a pre-alert message, and changing the label of the stored message to a second label indicating that the stored message is an unanswered message, if the stored message is not answered within a prescribed period of time, and changing the label of the stored message to a third label indicating that the stored message is an answered message, if the stored message is answered within said prescribed period of time, said control means being responsive to said power switch for sensing that said receiver means is activated by the battery for searching through said memory to detect messages therein;

means for generating first, second and third sound patterns;

means for alerting a user with the first sound pattern if the control means detects a message having said first label, and alerting the user with the second or third sound pattern if the control means detects a message having said first or second label, respectively; and means for displaying the answered message.

2. In a radio pager comprising a receiver for detecting a paging signal addressed to the pager, a battery, a manually operated power switch for activating said receiver with said battery when the pager is in use and deactivating said receiver when the pager is not in use, and a memory constantly activated with the battery, a method comprising the steps of:

a) storing into said memory a message transmitted by said paging signal;

b) classifying the stored message with a first label indicating that the stored message is a pre-alert message;

c) alerting a user with a first sound pattern and determining whether the stored message is answered within a prescribed period of time;

d) if the stored message is determined by step (c) to be not answered within said prescribed period of time, changing the label of the stored message to a second label indicating that the stored message is an unanswered message;

e) if the stored message is determined by step (c) to be answered within said prescribed period of time, changing the label of the stored message to a third label indicating that the stored message is an answered message and displaying the stored message;

f) detecting when said receiver is activated with the battery and searching through said memory to detect a message therein; and g) alerting the user with a second or third sound pattern if the message detected by step (f) is indicated by the first or second label, respectively.

* * * * *